US005509813A

United States Patent [19]
Lu

[11] Patent Number: 5,509,813
[45] Date of Patent: Apr. 23, 1996

[54] JOINT ASSEMBLY FOR ELECTRICALLY ENGAGING A PORTABLE COMPUTER WITH A BATTERY

[76] Inventor: Sheng N. Lu, No. 174, Chun Ying St., Shu Lin Chen, Taipei Hsien, Taiwan

[21] Appl. No.: 247,034

[22] Filed: May 20, 1994

[51] Int. Cl.⁶ ................................................. H01R 13/24
[52] U.S. Cl. .......................... 439/79; 439/500; 439/700; 429/121
[58] Field of Search ........................ 439/79, 80, 289, 439/500, 700, 824; 429/121, 178

[56] References Cited

U.S. PATENT DOCUMENTS

| | | | |
|---|---|---|---|
| 4,394,059 | 7/1983 | Reynolds | 439/500 |
| 4,934,954 | 6/1990 | Fransson et al. | 439/289 X |
| 4,944,568 | 7/1990 | Danbach et al. | 439/246 X |
| 5,158,477 | 10/1992 | Testa et al. | 439/500 X |

Primary Examiner—Khiem Nguyen
Attorney, Agent, or Firm—Merchant, Gould, Smith, Edell, Welter & Schmidt

[57] ABSTRACT

A joint assembly for electrically engaging a portable computer with a battery includes a first joint and a second joint. The first joint includes a first portion which defines at least one aperture and a second portion which defines a recess so that the aperture is in communication with the recess. A metal cylinder is received in the aperture and defines a closed end and an open end. A pin projects from the closed end of the metal cylinder and is soldered to a printed circuit board of the portable computer. A spring is received in the metal cylinder. A piston is slidably received in the cylinder. A male connector projects from the piston. The second joint defines at least one aperture. A female connector is received in the aperture which is defined in the second joint. A pin projects from the female connector and is soldered to the battery. The spring biases the male connector into firm engagement with the female connector when the second joint is received in the recess which is defined in the first joint.

4 Claims, 2 Drawing Sheets

JOINT ASSEMBLY FOR ELECTRICALLY ENGAGING A PORTABLE COMPUTER WITH A BATTERY

BACKGROUND OF THE INVENTION

The present invention relates to a joint assembly for electrically engaging a portable computer with a battery.

A portable computer is useful for a user who needs a lot of information when he/she travels. A battery is essential for actuating the portable computer when a mains power supply is impossible. Conventionally, a device for electrically engaging a portable computer with a battery includes a plurality of V-shaped metal strips which are soldered to a printed circuit board which is used in the portable computer and a corresponding number of straight metal strips which are soldered to the battery. Each straight metal strip is engaged with a corresponding V-shaped metal strip when the battery is received in the portable computer. Each V-shaped metal strip defines a first section and a second section. It is troublesome for a worker to solder the V-shaped metal strips to the printed circuit board and the straight metal strips to the battery, as it is difficult for the worker to retain the metal strips in position during the process of soldering. The second section of each V-shaped metal strip is for engagement with a corresponding straight metal strip. The engagement of the straight metal strips with the V-shaped metal strips may be insufficiently firm, as the straight metal strips are only engaged with the V-shaped metal strips by the elasticity of the V-shaped metal strips. The present invention is intended to solve the above-mentioned problems.

SUMMARY OF THE INVENTION

It is an object of the present invention to provide a joint assembly for electrically engaging a portable computer with a battery. The joint assembly includes a first joint and a second joint. The first joint can be easily attached to the portable computer. The second joint can be easily attached to the battery.

It is another object of the present invention to provide a joint assembly for electrically engaging a portable computer with a battery. The joint assembly includes a first joint and a second joint. The first joint can be firmly engaged with the second joint.

The objects of the present invention are achieved by providing a joint assembly which includes a first joint and a second joint. The first joint includes a first portion which defines at least one aperture and a second portion which defines a recess so that the aperture is in communication with the recess. A metal cylinder is received in the aperture and defines a closed end and an open end. A pin projects from the closed end of the metal cylinder and is soldered to a printed circuit board of the portable computer. A spring is received in the metal cylinder. A piston is slidably received in the cylinder. A male connector projects from the piston. The second joint defines at least one aperture. A female connector is received in the aperture which is defined in the second joint. A pin projects from the female connector and is soldered to the battery. The spring biases the male connector into firm engagement with the male connector when the second joint is received in the recess which is defined in the first joint.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 3:
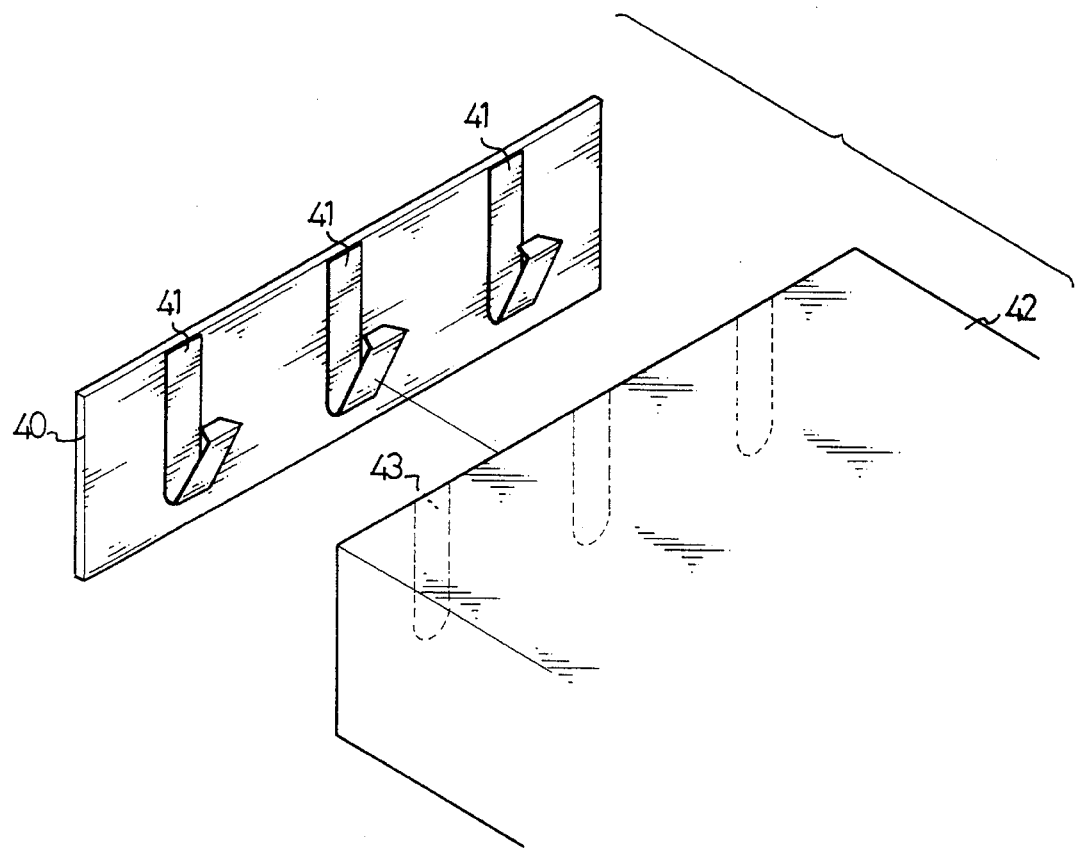
FIG. 3 is a perspective view of a joint assembly for electrically engaging a portable computer with a battery in accordance with the conventional device.

Prior to the detailed description of the joint assembly according to the preferred embodiment of this invention, description will be given to a conventional device for electrically engaging a portable computer with a battery referring to FIG. 3, in order to show advantages of the present invention over prior art.

The conventional device includes a plurality of V-shaped metal strips 41 each of which defines a first section and a second section. The first section of each V-shaped metal strip 41 is attached, by means of soldering, to a printed circuit board 40 which is used in the portable computer (not shown).

The conventional device includes a corresponding number of straight metal strips 43 which are attached, by means of soldering, to the battery 42. Each straight metal strip 43 is engaged with the second section of a corresponding V-shaped metal strips 41 when the battery 42 is received in the portable computer.

It is troublesome for a worker to solder the V-shaped metal strips 41 to the printed circuit board 40 and the straight metal strips 43 to the battery 42, as it is difficult for the worker to retain the metal strips in position during the process of soldering. The second section of each V-shaped metal strip 41 is for engagement with a corresponding straight metal strip 43. The engagement of the straight metal strips 43 with the V-shaped metal strips 41 is sometimes insufficiently firm as the V-shaped metal strips 41 are engaged to the straight metal strips 43 only by the elasticity of the V-shaped metal strips 41.

Figure 1:
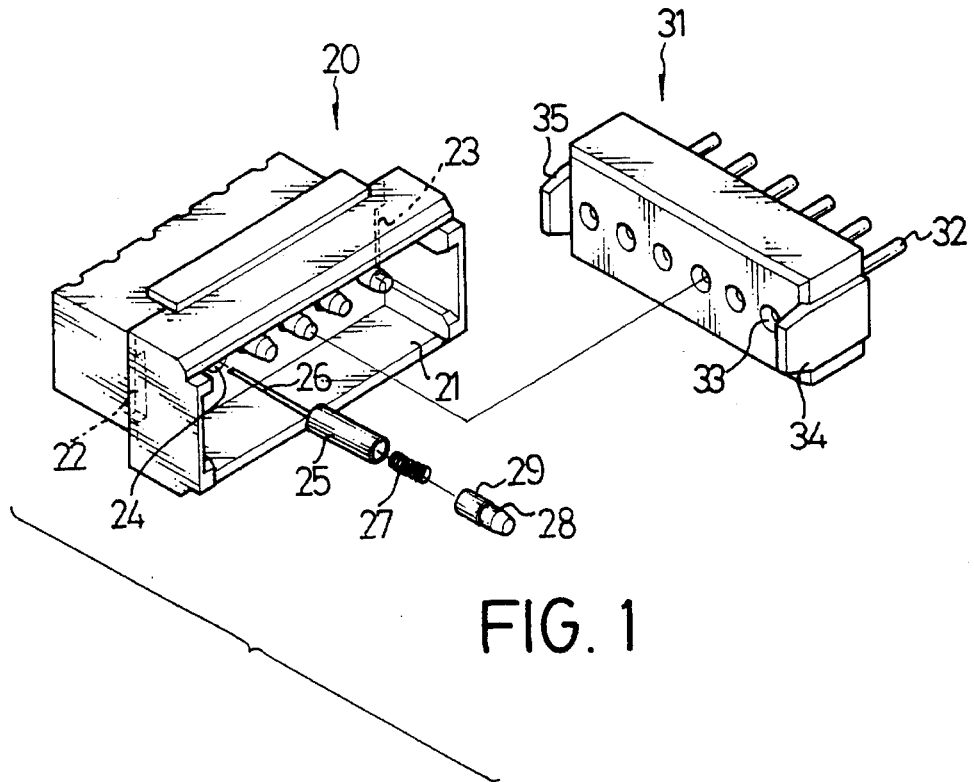
FIG. 1 is an exploded view of a joint assembly for electrically engaging a portable computer with a battery in accordance with the preferred embodiment of this invention.

Referring to FIG. 1, a joint assembly according to the preferred embodiment of this invention includes a first joint 20 and a second joint 31. The first joint 20 defines a stepped form which includes a first portion and a second portion. The first portion of the first joint 20 defines a plurality of apertures 24, the second portion of the first joint 20 defines a recess 21, so that the apertures 24 are in communication with the recess 21.

There is a plurality of metal cylinders 25 each of which defines a closed end and an open end. A pin 26 projects from the closed end of each metal cylinder 25. A number of springs 27 are each received in a corresponding metal cylinder 25. A plurality of male connectors 28 each define a first end and a second end. The first end of the male connectors 28 is shaped as a dome. A piston 29 is formed at the second end of each male connector 28. The diameter of each connector 28 is smaller than that of each piston 29. Each piston 29 is received in a corresponding metal cylinder 25. Each metal cylinder 25 is deformed near the open end thereof in order to slidably retain a corresponding piston 29 therein. Each metal cylinder 25 is received in a corresponding aperture 24 so that each pin 26 is inserted through a corresponding aperture 24. Each of the pins 26 is bent and inserted into a corresponding one of several apertures 11 which are defined in the printed circuit board 10 (see FIG. 2). The pins 26 are attached to the printed circuit board 10 by soldering. It is easy for a worker to solder the pins 26 to the printed circuit board 10 as it is easy for the worker to insert the pins 26 into the apertures 11.

The first section of the first joint 20 is disposed on the printed circuit board 10, the second section of the first joint 20 is disposed against an edge 12 of the printed circuit board 10. Thus, when second joint 31 is pushed by means of a force against the first joint 20 in order to engage the second joint 31 with the first joint 20, such force is transmitted to the printed circuit board 10, so that the pins 26 will not be deformed.

The second joint 31 defines a plurality of apertures 36 each of which defines a first section and a second section (see FIG. 2) so that the first section is tapered towards the second section. A plurality of female connectors 33 are each formed together with a pin 32. Each pin 32 is inserted through the second section of a corresponding aperture 36 when a corresponding female connector 33 is received in the first section of a corresponding aperture 36. The pins 32 are secured into the battery 30.

Figure 2:
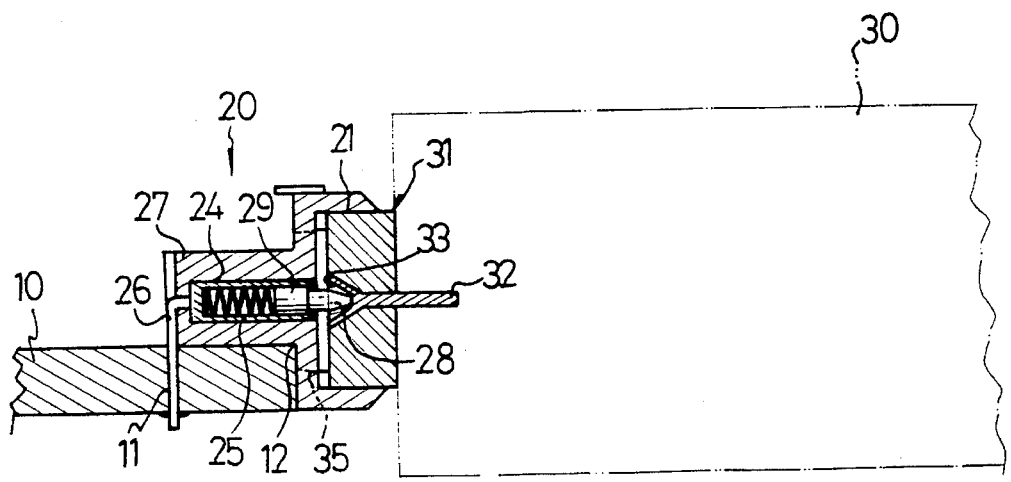
FIG. 2 is a cross-sectional view of a joint assembly for electrically engaging a portable computer with a battery according to the preferred embodiment of this invention.

Referring to FIG. 2, the second joint 31 is engaged with the first joint 20 when the battery 30 is received in the portable computer. The male connector 28 is received in the female connector 33. The spring 27 biases the piston 29 so as to abut the male connector 28 against the female connector 33, thus ensuring firm engagement of the printed circuit board 10 with the battery 30.

To replace a used battery with a new or recharged battery, a user can pull a used battery from the printed circuit board. However, doing this may disengage the battery 30 from the pins 32. Two slots 22 and 23 are defined in the first joint 20 and two tabs 34 and 35 are formed on the second joint 31, in order to obviate the above-mentioned problem. The slots 22 and 23 are defined in the second section of the first joint 20 so that the first section of the first joint 20 is between the slots 22 and 23. The tabs 34 and 35 are formed on two opposite sides of the second joint 31. The tabs 34 and 35 are inserted in a direction into the slots 22 and 23 when the second joint 31 is engaged in the first joint 20. The tabs 34 and 35 can be pushed in an opposite direction out of the slots 22 and 23. Accordingly, the second joint 31 is disengaged from the first joint 20.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A joint assembly for electrically engaging a portable computer with a battery comprising:

a first joint comprising a first portion which defines at least one aperture and a second portion which defines a recess so that the aperture is in communication with the recess, a metal cylinder which is received in the aperture and which defines a closed end and an open end, a pin which projects from the closed end of the metal cylinder and which is soldered to a printed circuit board of the portable computer, a spring which is received in the metal cylinder, a piston which is slidably received in the cylinder, a male connector which projects from the piston; and a second joint comprising at least one aperture which is defined therein, a female connector which is received in the aperture which is defined in the second joint, a pin which projects from the female connector and which is soldered to the battery;

whereby the spring biases the male connector into firm engagement with the female connector when the second joint is received in the recess which is defined in the first joint.

2. A joint assembly according to claim 1 wherein the male connector comprises a dome-shaped end.

3. A joint assembly according to claim 1 wherein the female connector is a tapered towards the pin which projects from the female connector.

4. A joint assembly according to claim 1 wherein the second portion of the first joint defines two slots so that the first section of the first joint is between the slots, wherein the second joint comprises two tabs which are formed at two opposite ends thereof, whereby the tabs are engaged in the slots when the second joint is received in the first joint.

\* \* \* \* \*